(12) United States Patent
Jones (10) Patent No.: US 11,858,703 B2
(45) Date of Patent: Jan. 2, 2024

(54) APPARATUS, SYSTEM AND METHOD FOR SECURING AND PREVENTING TAMPERING OF FOOD DELIVERY ITEMS

(71) Applicant: Zachary Jones, Wyandanch, NY (US)

(72) Inventor: Zachary Jones, Wyandanch, NY (US)

(73) Assignee: Grubguard, Inc., Wyandanch, NY (US)

( * ) Notice: Subject to any disclaimer, the term of this patent is extended or adjusted under 35 U.S.C. 154(b) by 0 days.

(21) Appl. No.: 16/847,777

(22) Filed: Apr. 14, 2020

(65) Prior Publication Data

US 2020/0331675 A1 Oct. 22, 2020

Related U.S. Application Data (60) Provisional application No. 62/914,490, filed on Oct. 13, 2019, provisional application No. 62/842,302, filed on May 2, 2019, provisional application No. 62/834,970, filed on Apr. 17, 2019.

(51) Int. Cl.
| | | |
|---|---|---|
| *B65D 55/02* | (2006.01) | |
| *A47G 29/30* | (2006.01) | |
| *G07C 9/00* | (2020.01) | |
| *G08B 13/08* | (2006.01) | |
| *H04W 4/02* | (2018.01) | |

(52) U.S. Cl.
CPC ........... *B65D 55/028* (2013.01); *A47G 29/30* (2013.01); *G07C 9/00912* (2013.01); *G08B 13/08* (2013.01); *H04W 4/02* (2013.01)

(58) Field of Classification Search
None
See application file for complete search history.

(56) References Cited

U.S. PATENT DOCUMENTS

| | | | | |
|---|---|---|---|---|
| 9,566,395 | B2* | 2/2017 | Denny | H04M 3/5116 |
| 2017/0253413 | A1* | 9/2017 | Mantry | B65D 81/34 |
| 2019/0130689 | A1* | 5/2019 | Baumgarte | H04L 9/3242 |
| 2019/0266824 | A1* | 8/2019 | Jeruchim | G07C 9/00912 |

FOREIGN PATENT DOCUMENTS

CN 110689680 A * 1/2020

* cited by examiner

*Primary Examiner* — Adolf Dsouza
(74) *Attorney, Agent, or Firm* — Law Office of Gerald Maliszewski; Gerald Maliszewski (57) ABSTRACT

A food delivery system includes a food delivery container and a cell phone programmed to monitor for unauthorized access to food content provided in the food delivery container, once secured. The food delivery container has an internal volume, an opening, a cover to cover the opening to prevent access, and uncover the opening to allow access, a device for securing the cover and a sensing device for detecting whether the cover, after being positioned to cover the opening, is (still) secured over the opening, in reliance upon a state of the device for securing. The device for securing first implements a pairing or synchronizing operation with the cell phone. If the sensing device detects that the cover is not secured over the opening by the device for securing, after first being secured and armed thereon, the cell phone determines whether an authorized access has occurred.

22 Claims, 8 Drawing Sheets

APPARATUS, SYSTEM AND METHOD FOR SECURING AND PREVENTING TAMPERING OF FOOD DELIVERY ITEMS

CROSS-REFERENCE TO RELATED APPLICATIONS

This application derives the benefit of the priority under 35 USC § 119(e) to U.S. Provisional Patent Application No. 62/914,490, filed Oct. 13, 2019, U.S. Provisional Patent Application No. 62/834,970, filed Apr. 17, 2019, and U.S. Provisional Patent Application No. 62/842,302, filed May 2, 2019; the contents of the provisional applications in their entireties are incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the United States Patent and Trademark Office patent files or records, but otherwise reserves all copyright rights whatsoever.

BACKGROUND OF THE INVENTION

The invention relates broadly to food delivery, and more particularly relates to apparatus for securing food delivery items to prevent tampering by food delivery persons, a system for securing and preventing tampering of food delivery items and a method for securing and preventing tampering of food delivery items.

SUMMARY OF THE INVENTION

The present invention overcomes the shortcomings of the known arts, such as that described above.

In one form, the inventive secure food container works by incorporating a wireless connection to a mobile phone of the delivery person, a power/sync button (on the container housing) and a near-field communication (NFC) chip that acts as a trigger. The NFC stores data that identifies the container and is attached to a sensor that can detect whether the container is 'armed or disarmed', depending on the final design of the product this basically means open or closed. When the delivery driver accepts a delivery, they interact with a push notification that is sent to them from the Grubguard™ mobile platform. When they click to accept the delivery, the phone will begin to 'look for the NFC chip' the same way that a card reader can detect an apple pay device. When the phone is moved close enough to the container, the phone will read the current status and confirm that the container is locked. This is the trigger point for when the container is secure, notifications are sent to all of the intended parties connected to the platform that the container is prepared for transit.

Preferably, the secure food container includes an inner temperature sensor, where food is placed inside the container, heat from the food item(s) trips the temperature sensor. During operation of this embodiment, a signal from the temperature sensor causes the NFC chip to turn on the mobile sync function The NFC chip is connected to a temperature sensor that is looking for a specific temp signal, i.e., a set temperature signal. The NFC chip receives simply a 'yes or no' signal from the temperature sensor, indicating that the contents of the bag are at a certain threshold temperature, and that the bag is ready to be secured. The clip then "pairs" with the secure food container and the secure food container "shows up" in the mobile application and the driver will pair with it. Through the mobile application, the driver then receives notification either indicates that the secure food container is armed or directs the driver to close (secure) the secure food container. This initiates the secure delivery and the driver is then able to return to his/her vehicle and make (complete) the delivery.

The invention also provides an inventive clip that is used to secure a food. delivery bag after the bag is loaded with food delivery items. The inventive clip works in reliance upon a wireless connection to a mobile phone in which the inventive mobile application is operational, a power/sync button provided on the secure clip and trigger means, such as a pressure sensor/switch that acts as a trigger. When a delivery order is picked up by a driver with the mobile application operational in his/her cellphone, the driver 'starts the delivery' by pressing the power/sync button [. Doing so sends out a signal similar to that required for pairing a new device via Bluetooth. Then, the driver presses the button on the inventive clip, which activates the trigger.

There many ways to implement the inventive system and method, where these different implementations are respectively more appropriate for different application scenarios, for example, dependent upon a few factors that can potentially change. The overarching inventive intent in light of possibly changing factors nevertheless is the same.

In an embodiment, the inventive device for securing, or dip, has a pressure sensor that is sitting under the torque spring that makes it open or close. In this embodiment, the user presses a button on the dip to activate the device for securing/clip. The user then attaches it to the bag being delivered. The pressure sensor is attached to an NFC chip that identifies the pressure being applied to the sensor due to the thickness of the bag. When the driver is prompted by the mobile platform that the bag is secure (through the application program operating in the driver's smartphone), the phone scans the NFC chip and 'locks in that pressure' 0 or basically makes that amount of pressure applied "0". If at any point the pressure deviates from "0" either up or down due to the clip being opened or being slid off the bag and pressure being released, the pressure sensor sends out a warning sign to the mobile platform that the clip is being tampered with.

Once the trigger is engaged, a feedback LED on the inventive clip will blink (e.g., green), and the inventive clip is then clipped onto the delivery bag opening to secure the food items. Once the inventive clip is released and left alone for 3 seconds, the LED feedback light turns red, meaning the bag is now secured. If the clip is thereafter opened, the pressure on the clip holding the bag together changes (to open), causing the clip to generate and transmit a notification to the manager of the venue supplying the food items, and/or the purchaser that ordered the food for delivery and/or a central monitoring location that manages orders, deliveries, etc. In one form, the inventive clip is outfitted with small spikes that cut deep scratches in a bag if the clip, once secured, is then removed. Upon arrival to the destination, the "delivery is ended" by disarming the trigger lock in front of the person(s) that made the order in the first instance.

Upon the driver's arrival at the destination, with the food contents included and secured in the container for delivery, the end user (i.e., the person or institution that ordered the food contents for delivery) typically meets the person delivering the secured container at the vehicle, or at the house or apartment door. In one implementation, they are asked via push notification whether they can see the driver and that the safety device (dip or container or bag) is also visibly attached to the bag. When they hit "Yes", the driver can interact with the clip without it sending out a warning sign. The device at this stage is not physically locked, although this technology could easily be implemented into a device that is. Preferably, message signals may be exchange between the application program portion operating at the server to manage purchases of the delivery services, exchange or pertinent data and pickup and deliveries, etc., and the driver, also to the end user (person who ordered the food contents) and also to the venue that prepared the food contents for delivery, through the API operated by the server.

In an embodiment, the invention provides a system for securing and monitoring a food container formed with an opening to an inner volume, in order to prevent unauthorized access to food contents arranged in the inner volume. The system comprises a device for securing the food container opening, with food contents therein, that prevents access to the food contents when the device for securing is in a closed state, the device for securing including a sensing device for detecting whether the device for securing is either an open (or unarmed) state or a closed (armed) state and a cell phone, in communication with the device for securing. After arranging food contents in the food container, closing the opening, securing the device for securing to the container opening and arming the device for securing to the closed state, an unauthorized access to the contents of the closed food container is determined if the sensing device detects that the device for securing is in an open state. Preferably, the device for securing comprises a clip.

Upon determining that the food container with the food contents therein is secured with the device for securing, the cell phone generates a food-container secured signal. The device for securing includes a power/synchronization element that is activated to pair the device for securing to the cell phone. The signal transmitting means communicates using signaling selected from the group consisting of Bluetooth signaling, near field communication (NFC) signaling and direct signaling through a hard-wired link between the controller and electronic monitoring device. Upon receiving an open state signal from the sensing device, after first determining that the device for securing is secured to the container at the opening and in a closed state, the system determines whether an unauthorized access has occurred.

Moreover, the device for securing and/or the cell phone communicates to an electronic monitoring system that determines whether unauthorized access has occurred. Also, the electronic monitoring system includes an application program that determines whether a detected access to the food container is authorized or unauthorized. The application program determines whether the detected access to the food container is authorized or unauthorized based on one or more of the following: global positioning system (GPS) data, a code input into the cell phone and a telephone call received by the cell phone.

The cell phone and/or the monitoring system receive(s) information identifying an owner of the food container contents associated with a device for securing in a closed state and attached to the closed food container, billing information associated with the food container contents, or both, and wherein the billing information can include cost for delivery thereof. The application program generates and transmits the authorized or unauthorized access signal to one or more of the following: a vendor monitoring system associated with an originator of the food container contents; a delivery monitoring system operating to monitor one or more food deliveries; and an telephone or cell phone of an intended recipient of the food container contents. The monitoring system implements an application programming interface (API) that is in communication with cell phones associated with respective containers.

Preferably, the cell phone includes an activation element that is activated to communicate that the food container is closed to secure the contents therein and the device for securing communicates with the cell phone using signaling selected from the group consisting of Bluetooth signaling, near field communication (NFC) signaling and direct signaling through a hard-wired link between the controller and electronic monitoring device. Upon receiving an open state signal from the sensor, after first determining that the food container is closed and the means for securing is in a closed state, the cell phone and/or monitoring system determines whether an unauthorized access occurred.

In an embodiment, the invention provides a method for securing a food container configured with a single point of access to an inner volume, to prevent unauthorized access to food stored therein. The method includes using the single point of access, placing food in the food container inner volume, closing the single point of access with the food therein, fixing a device for securing to the closed food container at the point of access, activating to arm the device for securing after or at a time of fixation to the single point of access, monitoring to determine if the device for securing is removed from the single point of access and communicating an unauthorized access if determined.

The method includes synchronizing the device for securing to the cell phone. The step of activating to arm includes handling the device for securing for generating a secured-container signal and. the step of monitoring includes monitoring a sensing device to detect whether the device for securing is in an open, non-fixed state or in a closed, fixed state. For that matter, the steps of monitoring and communicating are carried out by the device for securing. Alternatively, one or more of the steps of monitoring, determining and communicating is carried out by the cell phone in communication with the device for securing. The device for securing might communicate with the cell phone using signaling selected from the group consisting of Bluetooth signaling, near field communication (NFC) signaling and direct signaling between the device for securing and the controller positioned in a docking station.

In the method, the cell phone operates an application program and preferably, the step of determining is implemented by the application program to determine whether access is authorized or unauthorized in reliance upon data from the group of data consisting of: global positioning system (GPS), data comprising a code input into the device for securing, data comprising a code input into the cell phone, or received in a telephone call by the cell phone and a telephone call received by the cell phone. The step of communicating relies upon data from a group consisting of: data identifying the device for securing, data identifying an owner of the food contained in and secured by the food container, and data comprising billing information associated with the food container contents, and wherein the billing information can include cost for delivery thereof. For that matter, the step of communicating transmits an unauthorized access signal or generates and transmits a complete-delivery signal to an application programming interface (API) associated with one or more of the following: a vendor monitoring system associated with an originator of the food container contents; a delivery monitoring system operating to monitor one or more food deliveries; and an telephone of an intended recipient of the food container contents.

In an embodiment, the invention provides a food delivery system including a food delivery container and a cell phone programmed to monitor for unauthorized access to food content provided in the food delivery container, once secured. The food delivery container comprises a container housing defining an internal volume, an opening in the container housing through which the internal volume is accessed, a cover that covers the opening to prevent access to the internal volume, and uncovers the opening to allow access to the internal volume, a device for securing the cover to cover the opening and a sensing device for detecting whether the cover, after being positioned to cover the opening to prevent access, is secured over the opening. The device for securing first implements a pairing or synchronizing operation with the cell phone so that the cell phone can thereafter communicate with the sensing device. If the sensing device detects that the cover is not secured over the opening, after first being secured thereon, the cell phone determines whether an authorized access has occurred.

The food delivery container has a top, a bottom and at least one side wall, and the cover comprises the top and is removably positioned to cover the opening by attachment to a top edge of the at least one side wall. Alternatively, the cover comprises a door that is part of the top or part of the at least one side wall. Preferably, the door is hingedly attached to the top or at least one side wall and is removably positioned to cover the opening by a hinge. Also preferably, the cover, when removably position over the opening, forms a substantially air-tight fit and, most preferably, the food container and cover are shaped like a rectangle. A vertical barrier wall may be included within the internal volume, wherein the vertical barrier wall divides the internal volume into at least two sub volumes. One of the at least two sub volumes may be configured for containing liquid food content.

The securing device may take the form of a latch device, with accompanying necessary electronics. The sensing device is either included in the securing device or the food container. The sensing device senses whether the cover is positioned over the opening, whether the device for securing has secured the cover over the opening and whether both the cover is positioned over the opening and the device for securing has secured the cover over the opening. One ne of the sensing device or cell phone includes a means for communicating that the container is closed when the cover is positioned over the opening.

In one form of the invention, the sensing device communicates with the electronic device using signaling selected from the group consisting of Bluetooth signaling, near field communication (NFC) signaling and a physical electrical communication path formed between the sensing device and a docking station in which the electronic device is positioned. The electronic device is a cell phone operating an application program, and preferably, the application program determines whether access to the food container is authorized or unauthorized based on one or more of the following: global positioning system (GPS) data, a code input into the cell phone and a telephone call received by the cell phone.

The application program monitors one or more food delivery containers, and manages data from the group consisting of data defining a consumer or purchaser that ordered food content in one or more food delivery containers; data defining a supplier or venue of the food content secured within the one or more food delivery containers and data comprising billing information for the food contents, including any cost for delivery thereof. Preferably, the application program generates and transmits the authorized or unauthorized access signal to one or more of the following: a vendor monitoring system associated with an supplier of the food container contents, a monitoring system operating to monitor one or more food deliveries and a telephone or cell phone of an intended recipient of the food container contents.

BRIEF DESCRIPTION OF THE DRAWING FIGURES

Further features and advantages of the invention will become apparent from the description of embodiments that follows, with reference to the attached figures, wherein.

DETAILED DESCRIPTION OF THE INVENTION

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1A:
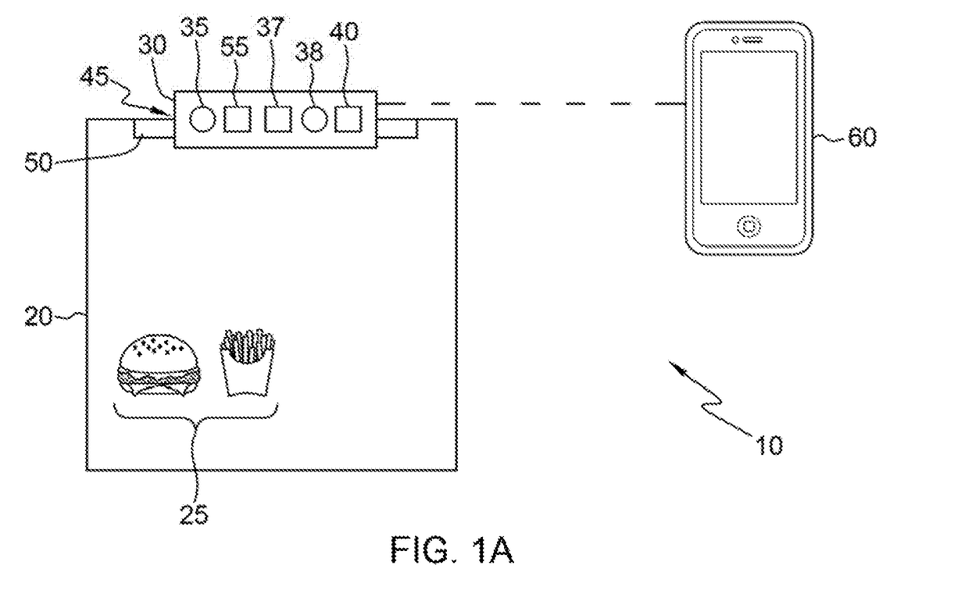
FIG. 1A presents a system for securing and monitoring a food container to prevent unauthorized access to contents therein, according to the invention.

FIG. 1A depicts an embodiment of a system 10 for securing and monitoring a food container 20 to prevent unauthorized access to food contents 25 therein. The system 10 comprises a device for securing 30 for securing the food container 20, with food contents therein 25. The device for securing 30 includes a sensor, or sensing device, 35 for detecting an open state or a closed state of the device for securing, at least one LED 38, a power/synchronization button 40 and a signal transmitting element or device 55. The sensor or sensing device 35 generates a sensor state signal representative of the detected open or detected closed state of the device for securing. The sensor device 35 may be a pressure sensor. The device for securing is powered by a DC battery 37, which may be rechargeable or disposable. The battery or cell 37 used to power the device for securing 30 may be any known battery. For that matter, the battery could be charged by conventional DC charging means that deliver charging current through a USB plug. The device for securing may include a USB port 39 to receive power to charge battery or cell 37, which powers all device elements.

First, the consumer goes on any food delivery application configured to work with the inventive system, places a food order at a relatively local food venue and pays. Alternatively, the inventive system includes a server implements a food ordering service (and preferably a monitoring system, as explained in detail below), which allows consumers to order/purchase food for delivery. Such server might also receive orders for delivery to consumers directly from a food venue, such as a fast-food restaurant, and would then implement communications to the consumer and/or the driver cell phones, in addition to managing the financial distribution of all income from the consumer's purchase of both the food items and the food delivery service. For that matter, driver communications to the consumer, or food venue, may be by way of the server only.

The driver then receives notification that the food order is ready for pickup, for example, by an email, IM, etc., preferably including directions from the driver's GPS location to the delivery address. Preferably, up arriving at the venue for pick-up, the driver is alerted (for example, by an application program running at the venue and in electronic communication with the mobile application operating in the driver's phone 60) to the number of inventive clips or containers necessary. The clips and food container include a source of electrical power, such as a rechargeable battery, that are readily charged by the driver's automobile.

Upon arriving at the venue, the power/synchronization button 40 is actuated and with the driver's cell phone 60 proximate the device for securing 30, the phone starts a syncing process to sync with the clip/secure food container. The food content 25 is loaded into the container 20. The container is then closed. The food container 20 is formed of plastic, glass, cardboard, paper, etc. The food container 20 includes an opening 45 through which food is inserted into and withdrawn from the container. The container 20 may include a cover 50, or some other device that allows the container, e.g., a "to go" bag, to be further arranged to cover or otherwise prevent access to the opening 45. For example, the container 20 might be a paper bag, a cardboard or plastic bag, or box-like container, that is folded to form a cover to cover the opening, or merely close the opening, to which the device for securing 30 is attached to securely close the food content therein.

The power/synchronization button may be activated by pressing, and by keeping it pressed for 1 to 3 seconds, to activate. Preferably, an LED light 38 is turned on to show that the inventive device for securing 30 is activated. While the LED light 38 is illuminated, for example, by intermittently flashing green, the driver presses the jaws to open the device for securing 30 and places it on the bag to secure the opening. Once pressure is removed (the clip, or device for securing) is closed about the bag opening), and the device for securing 30 has been stationary for some time (e.g., 3 seconds), the green LED changes color, e.g., turns red, and the clip is armed. Once armed, if you the driver (or anyone else for that matter) tries to remove the clip from the bag in which the food items are securely stored, the inventive device for securing 30 will send a notification to the end user (person who ordered the food for delivery) as well as the current manager on duty at the venue supplying the food. Alternatively, the alarm can be triggered if the driver's phone 60 is farther away from the food than it should be, meaning the driver has left the food somewhere unattended. The inventive device for securing 30 also may be adapted with small spikes on the clip contact point(s), which will leave rips in the bag if they are slid off without the clip being opened Once the food container 20 is closed with the food contents therein, the device for securing 30 is attached to the food container 20, at the cover 50, so that the opening, and the food contents in the closed container 20, cannot be accessed without being detected as an unauthorized access by the sensing device 35.

Alternatively, the food container 20 might comprise any known container such as a jar, where a cover 50 (optional in the dip-based embodiment of FIG. 1A) would be screwed onto the jar, or the container might embody a Tupperware™ container, or a common plastic "to go" container, where the cover would be a known, conventional snap-on or friction-fit complementary cover, as should be understood by a person of ordinary skill in the art ("skilled person").

The driver's cell phone 60 is in electrical communication with the device for securing 30, and/or one or more of the sensing device 35, signal transmission element 55 and power/synchronization button 40. Preferably, the electrical communication is wireless, via the signal transmission element 55, which might be an antenna, a near field communications (NFC) chip or a simple transmitting circuit or digital transmission device, that is driven by the state of the sensing device 35, and or a power/synchronization button (see also FIGS. 1B, 1C, 1D, 1E, 1F), to send one or more analog or digital signals. The signals may be simple as long as they can be relied upon by the cell phone 60, and the mobile application operational therein, to determine that the sensor 35 detects a closed-container state or an open-container state, and or that the power/synchronization button has been actuated to indicate that food is placed in the container and the container closed, without limitation.

Alternatively, the system 10 may further include a docking station (not shown) that the cellphone 60 is docked in, and the device for securing 30 is docked in, before, at or after food is placed in the container, the container closed and secured such that the sensor detects a closed-container state. Such condition facilitates a bus-like electrical communication path between the cellphone 60, the device for securing 30 and the components therein. The cellphone, and the mobile application operating therein, relies upon various signals, such as the signals from the device for securing, and other signals, or data to determine whether there is an unauthorized access to the contents of the closed food container, or an attempt at unauthorized access.

Figures 1B, 1C:
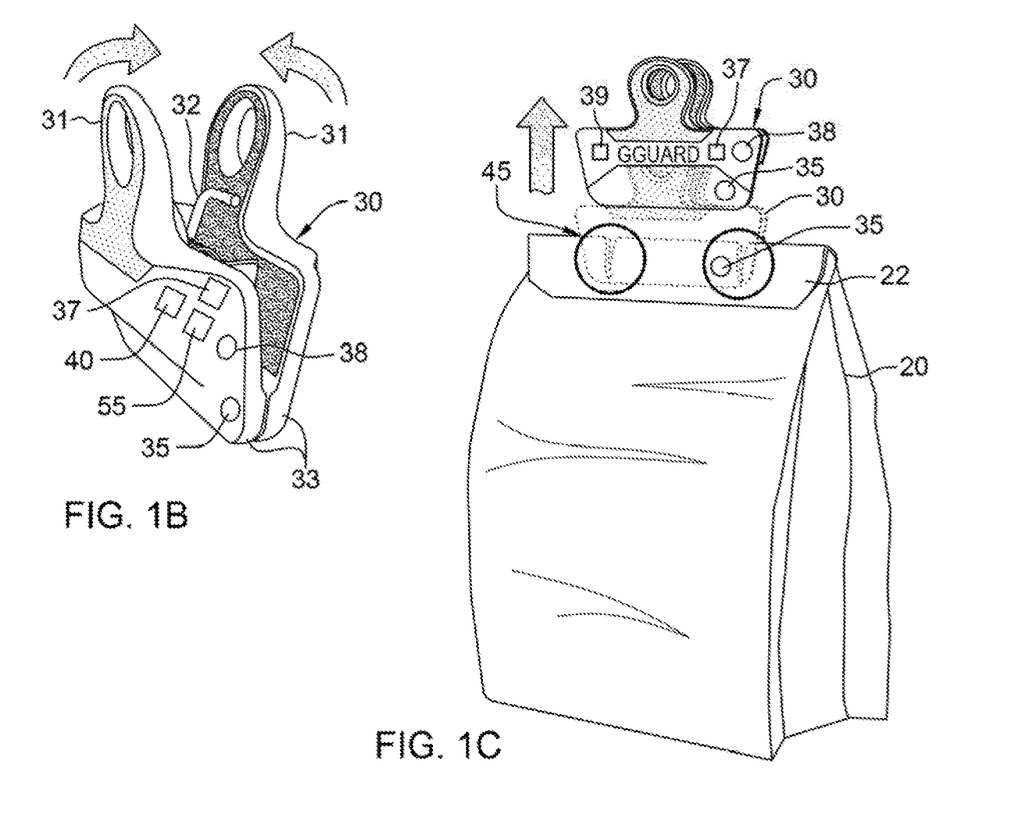
FIG. 1B presents a specific embodiment of the FIG. 1A system.
FIG. 1C demonstrates one way of implementing the FIG. 1 species.
Figure 1D:
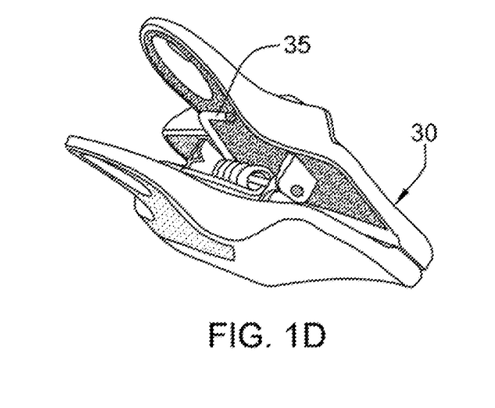
FIG. 1D presents a version of the device for securing depicted in FIG. 1A.
Figure 1E:
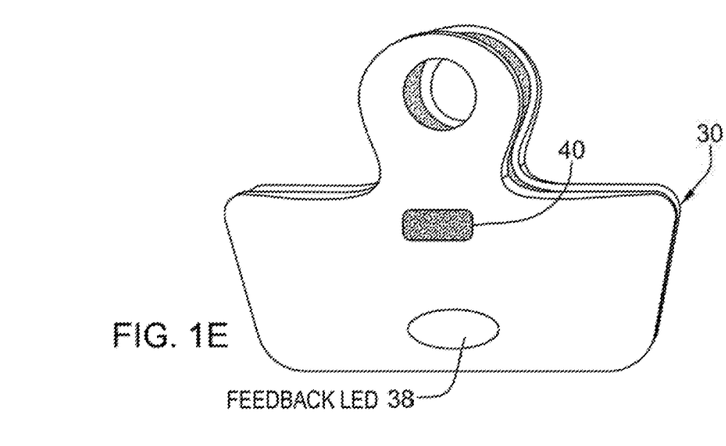
FIG. 1E presents a version of the device for securing depicted in FIG. 1A.
Figure 1F:
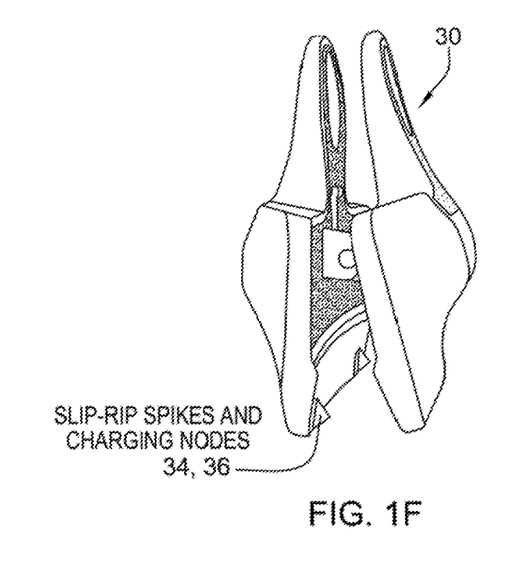
FIG. 1F presents a version of the device for securing depicted in FIG. 1A.

FIG. 1B depicts an exemplary device for securing 30 configured as a clip, which preferably is reusable. The inventive clip 30 includes graspable opposing compressible members 31, which are pressed together against a force exerted by a spring device 32, mounted therebetween, to open jaws 33. The open jaws 33, maintained by a squeezing force, are then positioned to grasp the cover, or a part of the container 20 (for example, folded over portion 22, as shown in FIG. 1C), which upon being squeezed by the jaws 33 (upon relaxation of a squeezing force of the members 31) grasps and presses to securely close the opening 45 in the container. The jaws 33 thereby close securely, according to the force imposed by the spring 32.

The sensing device 35 detects when the device for securing 30 effects a closure on a container opening 45, for example, in the clip embodiment, when the jaws 33 are sufficiently proximate (the sensing device senses the pressure effecting a closure, or a lack or pressure effecting an opening. As should be apparent to the skilled person, the sensing device 35 may comprise proximity, pressure or sensing elements on one or both opposing jaws 33, that detect when the jaws are sufficiently close to define a closed state, or separate to define an open or unsecured state. The sensing device 35 may alternatively comprise a pressure sensor (FIG. 1D) and/or some kind of direct contact or photodetection arrangement. In many cases, the jaws 33 in the closed state do not contact each other. To address this, the clip 30 may include slip-rip complementary spikes 34 that can pass through a paper product. The small spikes 34 cut deep scratches in a bag if removed and reattached, indicating tampering. to make electrical contact, to signal the cell phone. Charging nodes 36 operate also to effect detection of the closed state when in electrical contact, as known to the person of ordinary skill in the art.

Figure 1G:
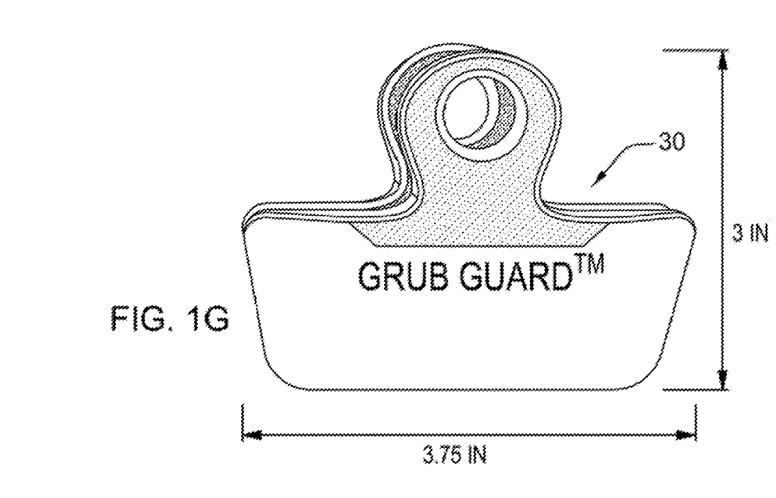
FIG. 1G presents a version of the device for securing depicted in FIG. 1A.

A light emitting diode (LED) 38 may be included (see FIG. 1E) that is connected to the power/synchronization button 40 and/or sensing device 35, that is activated temporarily, for example, for a fixed time period such as 1-3, or 15 seconds (preferably 1.5 seconds), to communicate to the user that the state of the device for securing 30 is detected as closed) FIG. 1G provides physical dimensions for an exemplary device for securing 30.

The mobile application operating in the cellphone 60 responds to the signal from sensing device 35 to determine that the food container with the food contents therein is closed and secured. However, the cell phone preferably relies upon both a signal from sensing device 35 and a signal from power/synchronization button 40 to determine that the device for securing 30 is in a closed-container state to generate a food-container secured signal.

In an embodiment, the signal transmission element 55 within the device for securing 30 comprises a signal transmitter, a signal receiver, a signal transceiver, a device for Bluetooth signally and/or a near-field communication (NFC) device. Alternatively, the signal transmission element may embody a hard-wired link between the device for securing 30 and the cell phone 60, such as a docking station to which the cell phone is docked and then electrically connected to the device for securing 30 once it is secured to a container 20 to secure food content therein.

After first determining that the food container is closed, and the device for securing is secured (for example, in reliance upon a signal from power/synchronization button 40), the system determines whether an unauthorized access occurred. The cellphone 60 may make such a determination, but alternatively, the cellphone may merely further communicate the required signals to a monitoring system 80, including an application programming interface (API) 85, operational in the monitoring system, for example, connected to and managed by a server 70 at a remote location that may communicate with the device for sensing and/or mobile application operating in the cellphone 60.

Figure 2:
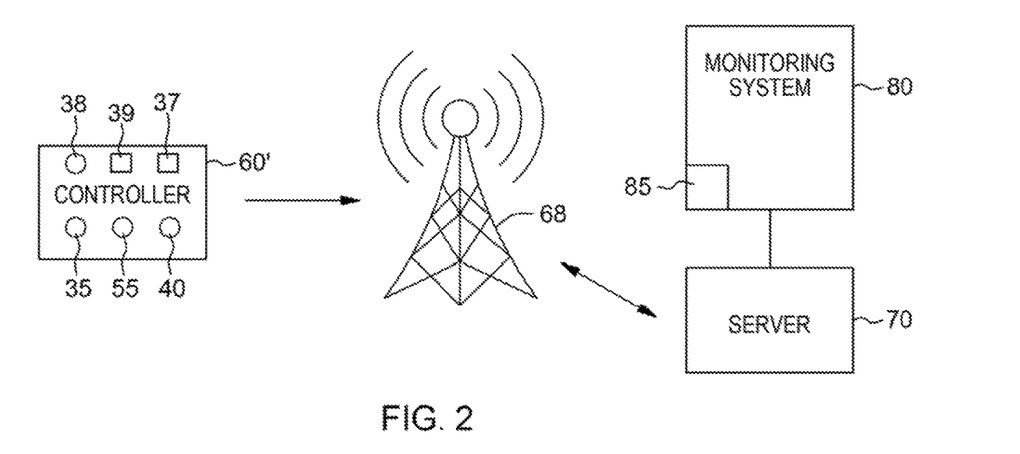
FIG. 2 depicts an alternative embodiment to the FIG. 1A system, wherein the elements of the device for securing are part of a controller, such as a cell phone.

FIG. 2 depicts a controller 60' that comprises the device for securing 30 (with sensing device 35, power/synchronization button 40 and signal transmission element 55), in communication to an monitoring system 80. The monitoring system 80 may comprise is managed by server 70. The electronic device 60 and/or monitoring system 80 may operate an application program interface (API) 85. The API may receive signals directly (through signal transmission means, not shown), or indirectly through cell tower or antenna 68 (see for example, FIG. 9).

Figure 3:
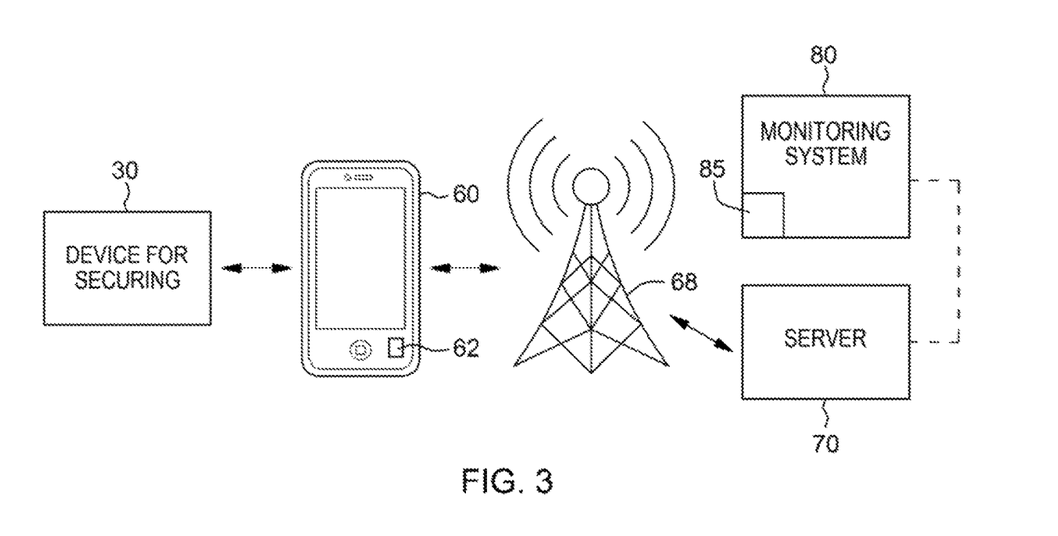
FIG. 3 presents a system level diagram representative of one communication arrangement between the device for securing and the electronic monitoring device and between the electronic monitoring device and a monitoring system and/or server.

In an embodiment depicted in FIG. 3, the cellphone 60 communicates with the device for securing 30, and/or the sensing device 35, and/or the power/synchronization button 40 and/or the signal transmission element 55 therein, directly. In this case, the cellphone 60 would implement and further communicate with the monitoring system 80, via server 70 to effect inventive operation. Preferably, the cellphone 60 includes an application program (portion), stored in a memory 62. The application program or mobile application determines whether a detected access to the food container is authorized or unauthorized, and communicate (automatically) accordingly. The application program also implements a delivery management service, that manages ordering food, securing the food in a container in reliance upon the device for securing and communicates billing information, and authorized and unauthorized access information to a monitoring service, such as operational through API 85 in monitoring system 80.

In a preferred embodiment, the cellphone 60 receives the signals provided by the device for securing 30, i.e., the sensing device 35 and/or the power/synchronization button 40 therein, for example, in reliance upon signal transmission element 55. In this case, when a delivery is picked up, the driver initiates the secure delivery process by actuating the power/synchronization button, or in an alternative embodiment, closing the food container 20 so that the sensing device detects an actual closure.

The power/synchronization button signal, once activated [please verify], initiates a syncing process in the cellphone that will pair with the device for securing 30 to the phone. For example, the driver may press the sync button 40, and hold it pressed for 1.5 seconds. An LED included on the device for securing 30 flashes (e.g., green) meaning it is ready to be attached to the food bag/container 20. While flashing green, the driver opens the clip and places it on the bag/container 20. Once pressure has been removed (no longer applied) and the device for securing 30 has been stationary for 3 seconds (for example), the LED changes color, for example, turns red indicating that the device for securing is armed. Once armed, if you anyone (such as the driver) tries to remove the device for securing, the device for securing communicates with the mobile application and/or the person who ordered and/or a management system and/or the venue serving the food items (for example, the current manager on duty).

Once the device for securing 30 is opened (after it has first been "armed"), a change of state from closed to open, which is communicated to the mobile application operating in the cell phone. The cell phone then sends out a notification to one or more of a monitoring system, a point of sale system at the food manager, a call or text to the food's intended recipient (purchaser), or some other interested party. This may not be necessary though depending on the sensitivity of the pressure gauge, in the case where the sensor is a pressure sensor-based sensor. Upon arrival to the intended destination, the "delivery is ended." If the person who orders the food items for delivery accepts the food, the device for securing is disarmed. For that matter, there are two ways for disarming the device for securing or clip of this embodiment. The device for securing or clip may be disarmed manually, or electronically by a signal sent to it from the driver's cell phone when proximate, or the application program portion operational in the server.

Whether the device for securing 30, the controller 60', the cell phone 60 (e.g., application program stored or downloaded and operational therein), the API 85 or monitoring system 80 determines that the detected access to the food container is authorized or unauthorized based on signal processing. A change from a closed state signal (armed) to an open state signal (unarmed), generated by the sensing device 35, may be relied upon to indicate that the device for securing is opened to access a secured food container. But the sensing device 35 will generate an open state and closed state signal any time the device for securing is physically adjusted to an open state or a closed state, for example, whether the device for securing is a clip as shown in FIG. 18, and the jaws are moved to positions that sufficiently effect the respective open and closed states.

Preferably, the actuator/sync element signal in included in any processing, to complement the open (unarmed) and closed (armed) state signals from the sensing device 35. That is, once a user has arranged the device for securing 30 on the closed container to secure the food contents therein, and the device once secured becomes armed. Thereafter, if an open state signal is received from the device for securing (e.g., the sensing device 35), it is assumed that a formally closed container 20 has been accessed.

In order to determine that an access to a closed and secured food container is authorized, additional signals may be relied upon. To do, the device for securing 30, the controller 60', the cell phone 60 (e.g., application program stored or downloaded and operational therein), the API 85 operated by the application program portion operational in the monitoring system 80 may rely upon global positioning system (GPS) data, indicative of the location of the device for securing 30 or the cell phone 60 or controller 60', a code input into the cell phone (mobile application operational therein), a telephone call received by the cell phone 60, for the person to whom the food has been delivered of by the monitoring system 80 when it receives a payment acknowledgement from the receiver of the delivered food, the vendor, etc., without limitation.

Preferably, the device for securing communicates data identifying itself to the cell phone 60, controller 60', or monitoring system 80, so that multiple deliveries may be monitored. The identification data may be presented as part of a signal, and processed, for example, by the application program operating in the cell phone (mobile application) or server 70. Preferably, at synchronization, other data are generated, or input, and provided to the cell phone and/or application program, identifying an owner of the food container contents associated with a device for securing in a closed state that is attached to a closed food container, billing information associated with the food container contents associated with a device for securing in a closed state that is attached to a closed food container, or both, and wherein the billing information can include cost for delivery thereof, or any other data associated with the delivery, the deliverer, and/or the intended recipient of the food content.

This data may be provided by a point of sale system at the place where the food contents are placed and secured in the food container, according to the inventive principles, by the deliverer in the embodiment that relies upon his/her cell phone (in which the application program is operational). Alternatively, the data may be downloaded to the cell phone, i.e., application program operating in a cell phone from a monitoring system that manages deliveries. As such, the monitoring system 80 also would optionally be in communication with the venue providing the food content for delivery, according to the inventive operation.

An alternative food delivery system 100 constructed according to the invention is depicted in FIG. 4A-4D. Food delivery system 100 includes a food delivery container 120 and a cell phone 160 configured to monitor for unauthorized access to food content provided and secured in the food delivery container for delivery, typically to a consumer who has ordered the food content at a relatively local venue, online through available applications. For example, a server such as server 80 that implements the monitoring system 80 and API 85 may also operate a food ordering service, that allows consumers to order/purchase food for delivery. Such server might also receive orders for delivery to consumers directly from a food venue, such as a fast-food restaurant, and would then implement communications to the consumer and/or driver cell phones. For that matter, driver communications to the consumer, or food venue, may be by way of the server only.

Figure 4A:
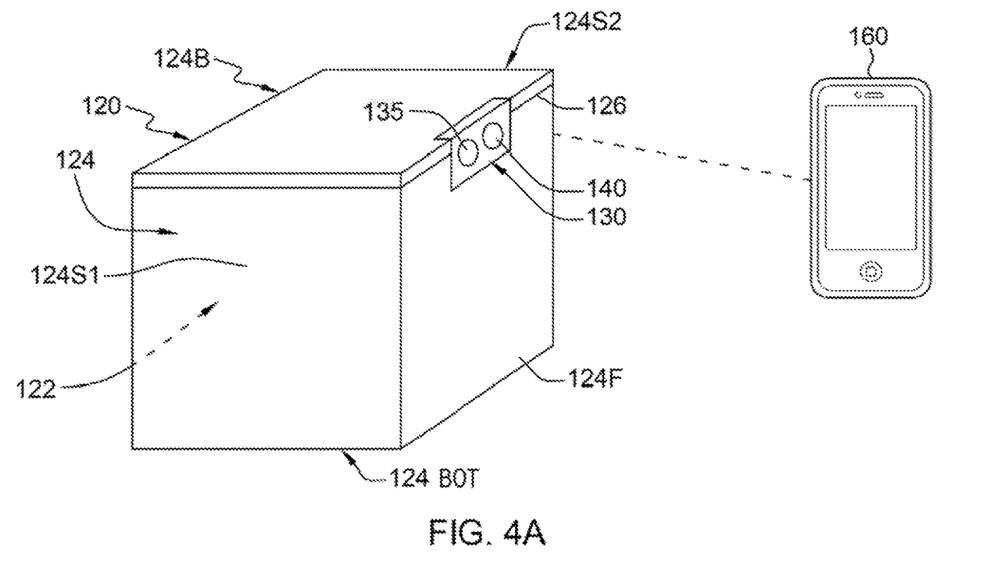
FIG. 4A presents an embodiment of a food delivery system constructed according to the invention.
Figure 4B:
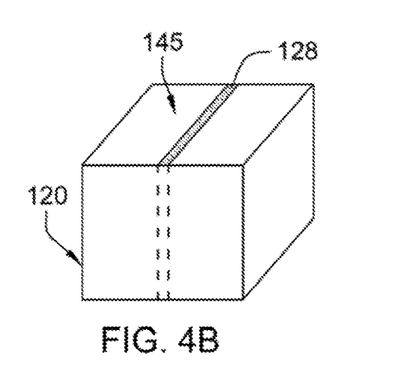
FIG. 4B presents one embodiment of the food container depicted as part of the FIG. 4A system.

The FIG. 4A food delivery container 120 is rectangular, and defined by a container housing 124 comprising a front side wall 124F, a back side wall 124B, a left side wall 124l, a right side wall 124S2, a bottom side wall 124Bot, and a top side wall/cover 126 defining an internal volume 122. The FIG. 4C food delivery container 120' is cylindrical, and comprises a container housing 124' (cylindrical side wall 124Cyl, cylindrical top wall/cover 124C, base cylindrical side wall 124Base). Please note that the rectangular and cylindrical embodiments are presented for exemplary purposes only, and are not meant to limit the scope of the invention in any way.

Figure 4C:
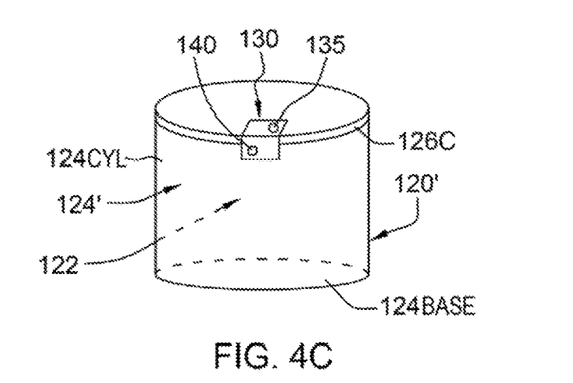
FIG. 4C identifies an alternative embodiment of the container depicted as part of the FIG. 4A system.
Figure 4D:
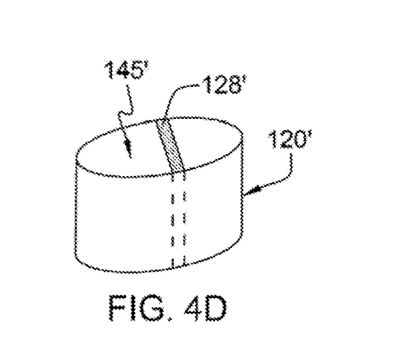
FIG. 4D presents one embodiment of the food container depicted as part of the FIG. 4A system.

An opening 145 in the container housing 124, 124', through which the internal volume is accessed, is realized when respective covers 126, 126C are removed. Covers 126, 126C cover and secure the opening 145 to prevent access to the internal volume 122, and uncovers the respective openings 145 to allow access to the respective internal volumes. A sensing device 135 detects whether the cover 126 is positioned to cover the opening 145 to prevent access, whether the cover 126 is not positioned over the opening 145 (i.e., removed). The sensing device 135 is preferably positioned within a securing device 130.

The cell phone 160 is in communication with the securing device 130, and preferably in communication with the sensing device 135. If the sensing device 135 detects that the cover 126, 126C is not positioned over the opening 145, the sensing device provides an open state signal to the cell phone 160. Based thereon, the cell phone 160 determines whether there is unauthorized access to the internal volume 122. Likewise, the cell phone 60 relies upon a closed state signal provided by the sensing device 135 to determine if the containers 120, 120' are secured, i.e., if the covers 126, 126C, are in place and secured for a secure food delivery.

In the embodiments shown in FIGS. 4A-4D, the covers 126, 126C comprise the top of the respective containers 120, 120' and are removably positioned to cover the opening 145 by attachment to a top edge of the 4 rectangular side walls (124F, 124B, 124S1, 124S2) or cylindrical side wall 124Cyl. In this case, the openings 145, 145' are approximately the size of the respective covers 126, 126'. Alternatively, the covers 126, 126C comprise door-like openings that are only part of the covers', or a part of the side walls, or part of both (not shown) without deviating from the scope and spirit of the invention. In that case, the covers may be hingedly attached to the top and/or to at least one side wall and is removably positioned to cover the opening 145, 145' by a hinge (not shown).

Preferably, the covers 126, 126', when removably positioned over the respective openings 145, 145', form a substantially air-tight fit. Also, the containers 120, 120' may include a vertical barrier wall 128, 128' within the internal volume 122, 122' (see FIGS. 4B, 4D). The vertical barrier walls 128, 128' divide the respective internal volumes into at least two sub volumes. There may be any number of dividing walls within a particular internal volume design, within any number of sub volumes. Preferably, a sub volume is configured for containing liquid food content.

In an embodiment, the securing device 130 secures the closed covers 126, 126' in position over the respective openings 145, 145' to prevent unauthorized access to the respective internal volumes 122, 122' and releases the secured covers 126, 126' from secured positions over the respective openings to allow access to the respective internal volumes. Preferably, the securing device 130 is a latch. Preferably, the sensing device 135 is included in the securing device or latch 130. Alternatively, the sensing device 135 is part of the respective food containers 120, 120'.

Preferably, the sensing device 135 senses or detects whether the cover 126, 126' are positioned over the respective openings 145, 145' and "set" to secure the covers 126, 126' over the respective openings 145, 145'. Preferably, the sensing device 135 detects a state in which the cover is positioned over the opening and a state in which the securing device has secured the cover(s) over the opening(s).

There are many ways to do so according to the inventive principles. For example, the sensing device 135 could include a temperature sensor that senses heat from food items once they are placed in the container and the cover attached (in response to a heat build-up). For example, once pizza is positioned in the internal volume and covered, heat from the pizza triggers the sensor, which turns on the syncing feature on.

Alternatively, the securing device 130 may include an power or synchronizing ("sync") element 140, which would generate and provide to the cell phone one or more signals indicating that the container is not only positioned over the opening but also secured in placed for tamper-proof delivery.

Once synced, the container will "expect" to be locked within a certain period of time. The system will detect if it is locked by either a signal generated by a button depressed at the place the food is loaded, or when a closing clasp is clipped into a sensor bridge arranged on the container, for example, at the top, or the cover includes a latch that senses its open latch and closed latch state. Locking the clasp or latch (or hitting an "armed" button) arms the GrubGuard™ system. If the clasp or latch is opened before reaching the driver's final destination, the clasp/latch will signal and the system will alert both the end user and the managing staff for the delivery company.

Figure 5:
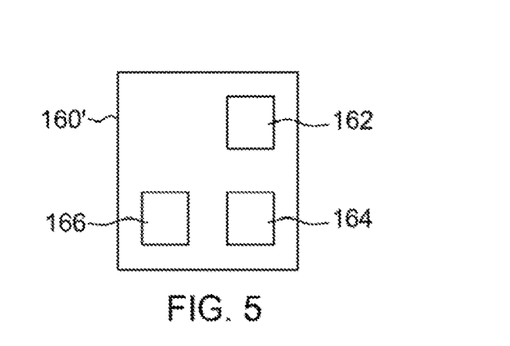
FIG. 5 depicts an implementation of the control of the invention implemented as a cell phone.

The securing device 130 and/or the sensing device 135 communicate with the controller, i.e., cell phone 160 in reliance upon signaling selected from the group consisting of: Bluetooth signaling, near field communication (NFC) signaling and a physical electrical communication path formed between the sensing device and a docking station in which the controller is positioned. The cell phone or other electronic communication device 160' preferably operates an application program. The electronic communication device 160', like the cell phone 160, includes a processor 162, a memory 164 and a transceiver 166. The processor operates an application program, preferably stored in or downloaded to memory 164, which during operation determines whether access to the food delivery container is authorized or unauthorized.

Preferably, the application program determines whether access to the food delivery container is authorized or unauthorized based on one or more of the following: global positioning system (GPS) data, a code input into the cell phone and a telephone call received by the cell phone. The application program monitors one or more food delivery containers, and manages data from the group consisting of data defining an owner of the one or more food delivery containers; data defining an originator or purchaser of food content secured within the one or more food delivery containers and data comprising billing information for the food contents, including any cost for delivery thereof.

The application program generates and transmits the authorized or unauthorized access signals. For example, the authorized or unauthorized access signals may be transmitted from the application program to a monitoring system, operated in a server, that monitors drivers that rely on the secured containers and mobile application, a vendor monitoring system, an independent food ordering and delivery application, an application program with an originator of the food container contents, such as a conventional point of sale system, and to the telephone (i.e., a smartphone or cell phone) of an intended recipient (the ordering consumer) of the food container contents. Using the driver's GPS on their phone, the system allows the consumer, food content vendor and/or monitoring system to track the driver (phone) if the application program cannot do so independently. When the driver arrives at the delivery destination, the mobile application cooperates with the GPS on his phone to disarm the container and/or remove the device for securing within eyesight of the consumer who made the food delivery order.

Figures 6A, 6B:
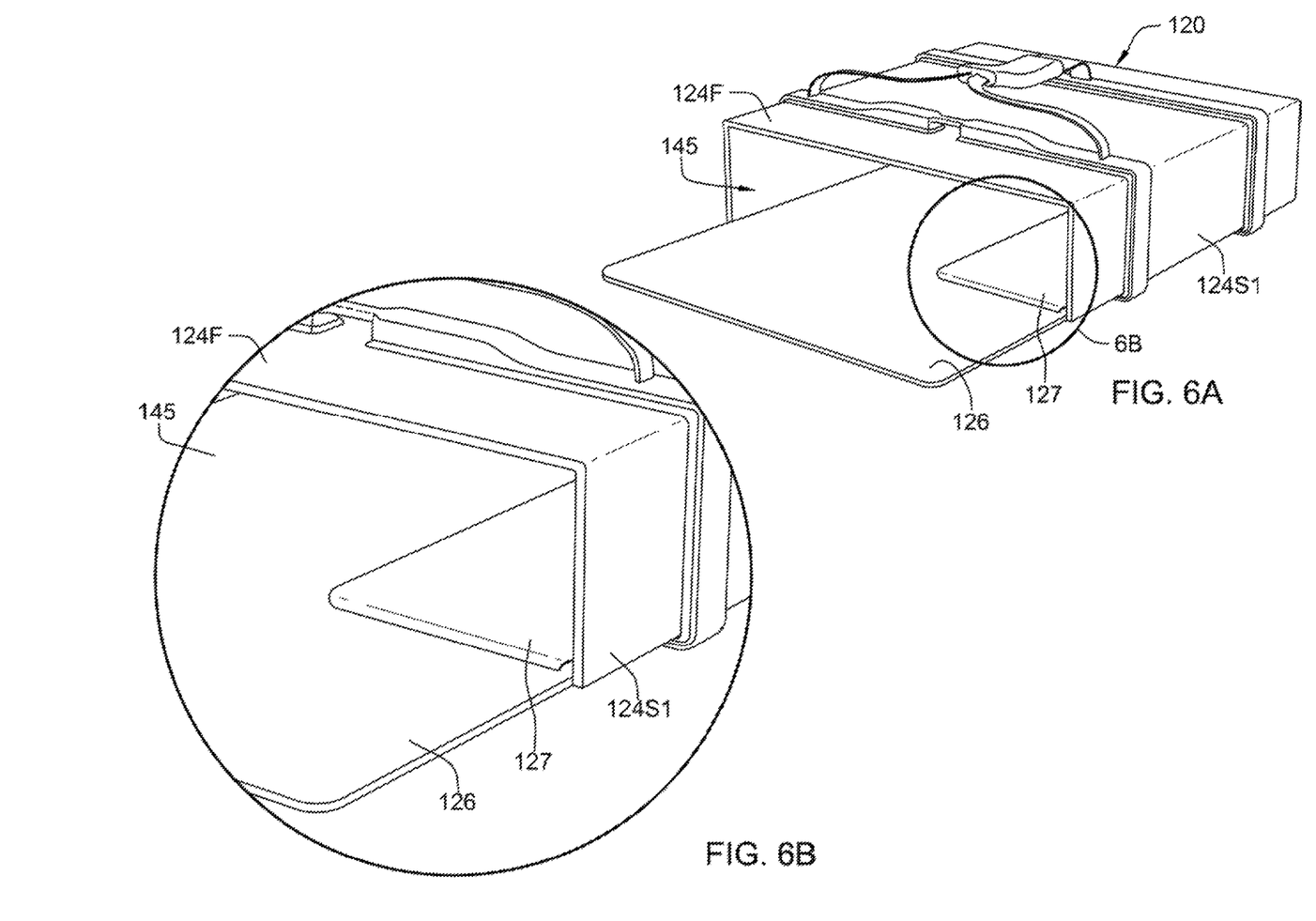
FIG. 6A presents one implementation of the inventive food container designed to deliver a particular food such as pizza.
FIG. 6B shows an enlarged view of a portion of the food container shown in FIG. 6A.

FIG. 6A shows one implementation of the inventive food container 120, designed to deliver a particular food such as pizza. FIG. 6B shows an enlarged view of a portion of the pizza food delivery container 120, to highlight an internal ledge 127, included to separate a portion of the internal volume, so that smaller objects, like a pizza deliver box that is smaller than a conventional sized pizza delivery box, will not slide when inserted in the container 120 for delivery, i.e., during transport.

Figures 7A, 7B:
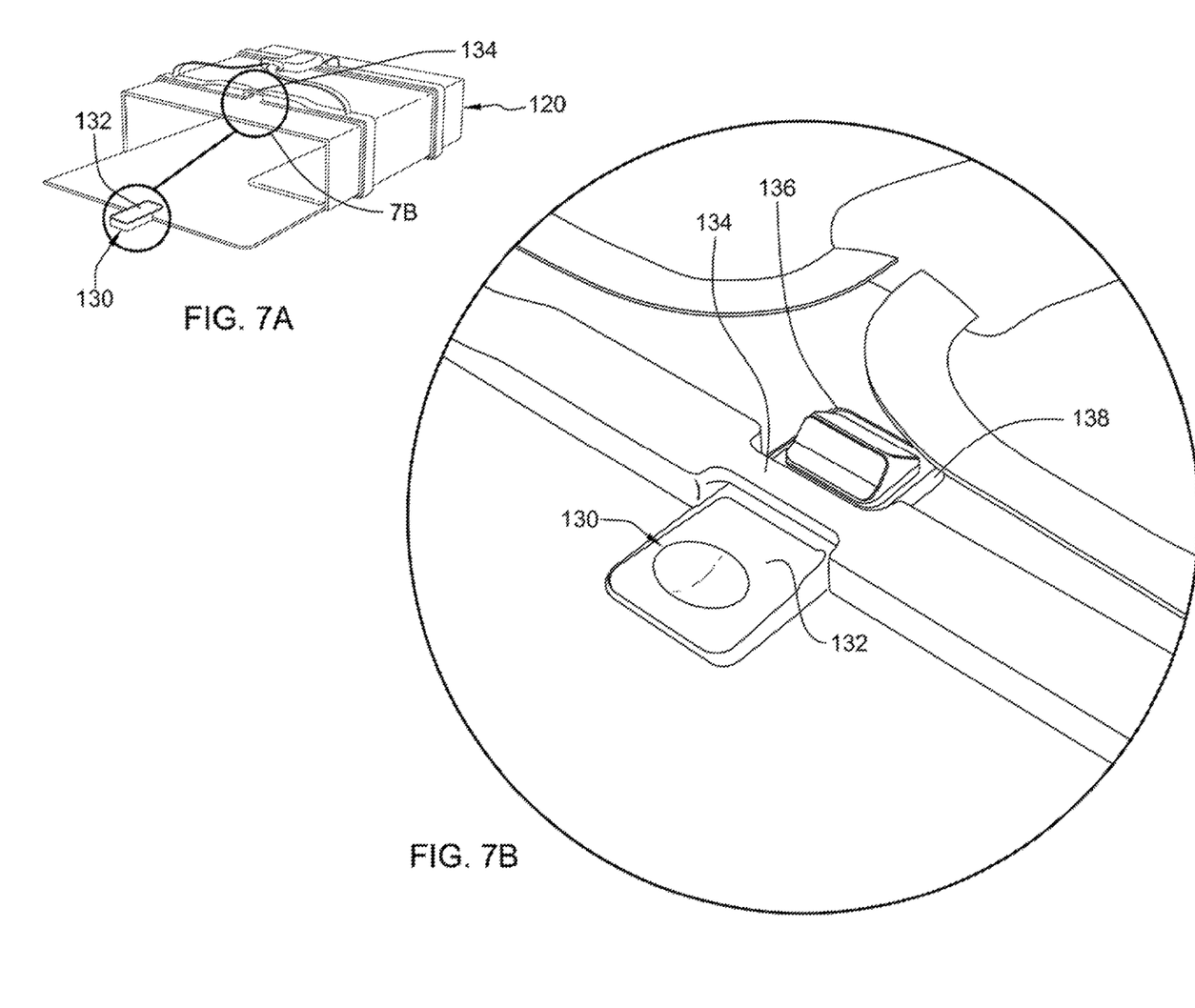
FIG. 7A presents a view of the FIG. 6A container that highlights use of a near field communication (NFC) device in the securing device.
FIG. 7B presents one embodiment of the FIG. 7A securing device as a latch or locking device 130, and its operation as part of the system.

FIG. 7A Highlights use of a near field communication (NFC) device 132 in securing device 130, configured in the embodiment shown as a latch or locking device. The latch or locking device 130 also includes sensing device 135' (not shown), which comprises a heat sensor that can sense heat from food contents, i.e., a change in temperature. The latch or locking device 130 also identifies when it is in a latched state, i.e., a state after a thumb lever or button 136 at a latching end 138 is depressed and the latch or locking device 130 is slid through a locking bridge 134, which allows the thumb lever or button 136 to spring back into its normal extended state (FIG. 78). In this case, the securing device generates a lock signal. Also, the sensing device 135' generates a signal representative of heated food content, if detected. The signals, or a logical signal indicative of a locked state with secured food content (hot food), is transmitted using NFC device 132 to the controller or cell phone 160. Alternatively, the NFC device 132 may be a Bluetooth device.

The cell phone 160, e.g., the application program operating therein, will receive the signal and/or pair with the securing device 130, based on the signal or signals transmitted from the sensing service in the latch or lock 132. This may be referred to a syncing, or "sync." For that matter, the pairing can occur before the latch or lock is secured, so that after syncing, the thumb lever or button 136 at the latching end 138 is depressed and the latch or locking device 130 is slid through a locking bridge 134, and the thumb lever or button 136 springs back into its normal extended state (FIG. 78), to generate the locking signal. Then, when (and if) the sensing device 135' generates a signal representative of heated food content generate the signal to the cell phone essentially defining a secure state of the container 120. If the container, i.e., the securing device 130, is opened before reaching the final destination, the system will alert any or more of the intended food recipient or consumer, a monitoring system operating an inventive API, the food vendor and a point of sale system at the vendor location.

Figure 8:
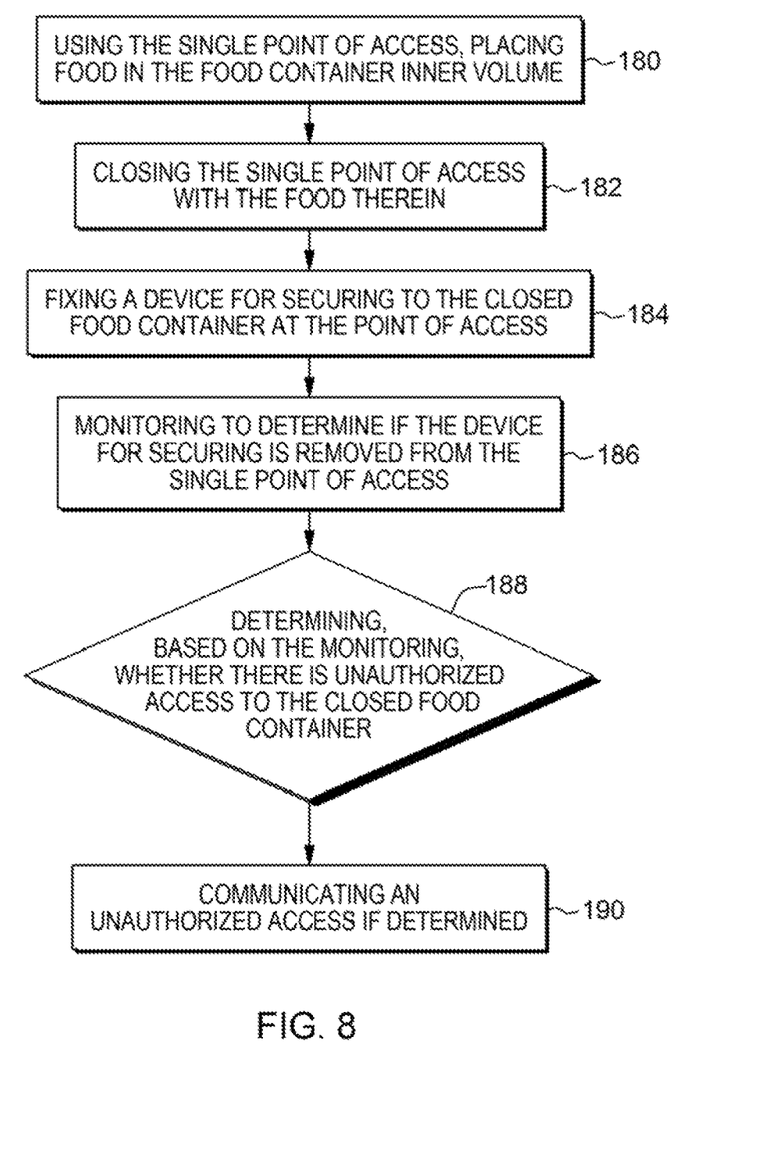
FIG. 8 presents a flow chart depicting one embodiment of the inventive method, implemented by a processor.

The invention also provides a method for securing a food container configured with a single point of access or opening to an inner volume of the food container, to prevent unauthorized access to food stored therein. The method includes certain acts or steps, as depicted in FIG. 8. Text box 180 represents the step or act by which, using the single point of access or opening, placing food in the food container inner volume. The food container may be a bag or sack 20 or a container 120.

The text box 182 represents the step or act by which the single point of access with the food therein is closed. For a bag, the single point of access is the opening, which is preferably folded or covered. The container 120 may be a box with a removable lid or cover, or with a hinged lid or cover. Text box 184 represents the step or act by which a device for securing, such as identified and described as element 35, 135 above herein, is secured to the closed food container(s) at the point of access. For example, the device for securing 30 would be clipped to the bag at the folded over or otherwise covered opening and the latch or clasp in the container secures the cover over the opening.

Text box 186 represents the step or act by which the device for securing is monitored to determine if it has been removed from the single point of access. If the devices for securing 30, 135 detect that the clip. clasp or latch are opening, a signal is generated and communicated to the mobile applications and/or monitoring system server. Decision diamond 188 represents the step or act by which, based on the monitoring, whether unauthorized access to the closed food container has occurred is determined. The decision making is carried out by the processor implementing the mobile application or the server implementing the monitoring system, based on signal data as well as any other data available to a cell phone, as known to those with skill in the art. Text box 190 represents a step by which the mobile application has determined that there has been unauthorized access and communicates same.

In an embodiment, the step of closing (182) includes generating a closed-container signal, for example, by the device for securing, securing device, sensing devices, actuator or syncing device, or other means disclosed above that might be relied upon by a cell phone or other controller, application program, monitoring system, point of sale system, etc., according to the inventive principles. The step of fixing (184) includes generating a secured-container signal. The step of monitoring (186) may include monitoring a sensor in the device for securing that detects whether the device for securing is in an open, non-fixed state or in a closed, fixed state. The step of monitoring (186) may be carried out by the device for securing. The step of determining (188) may be carried out by the device for securing. The step of communicating (190) may be carried out by the device for securing.

Preferably, one or more of the steps of monitoring (186), determining (188) and communicating (190) is carried out by a cell phone in which the mobile application is operational in communication with the device for securing. In that case, the device for securing communicates with the cell phone using signaling selected from the group consisting of: Bluetooth signaling, near field communication (NFC) signaling and direct signaling between the device for securing and controller positioned in a docking station.

Preferably, the cell phone includes an I/O device, memory, processor, transceiver (or other communications means), GPS device, without limitation, as known to the person of ordinary skill in the art. As such a set of computer readable instructions in a form of an application program may be received by the I/O device, memory stored and processed by the processor to implement at least the steps of monitoring and determining and communicating in reliance upon the transceiver or other communications means.

In one form, the method implements the step of determining (88) by the application program to determine whether access is authorized or unauthorized in reliance upon certain delivery completion data. That delivery completion data, without limitation, includes global positioning system (GPS), data comprising a code input into the device for securing, or input into the cell phone, or input into a device that sends the code to the cell phone, or a telephone call received by the cell phone.

In order to implement the step of communicating after a determination of authorized or unauthorized access has been made, the step of communicating (90) relies upon certain identifying data. The certain identifying data can include without limitation data identifying the device for securing, data identifying an owner of the food contained in and secured by the food container, data comprising billing information associated with the food container contents (where the billing information can include cost for delivery thereof), data identifying the application program, data identifying the cell phone, data identifying the driver, data identifying the food vendor, data identifying a point of sale system or device relied upon by the food vendor.

The step of communicating may transmit an unauthorized access signal or generate and transmit a complete-delivery signal to an application programming interface (API). The API is generated and operated by the inventive monitoring system. The API can send a communication in response thereto to the driver, to the end user, to the vendor, or a vendor monitoring system associated with an originator of the food container contents, i.e., the vendor communication system such as a vendor server, telephone or point of sale system, a delivery monitoring system operating to monitor one or more food deliveries in reliance upon the aforementioned identifying data and an telephone (number) of an intended recipient of the food container contents.

The reader and the person of ordinary skill in the art should understand that while the above explanation describes the portion of the inventive method comprising the steps of monitoring, determining and communicating as implemented by an application program present on a driver's controller/cell phone, the inventive method alternatively, or additionally, may be present in and operational on any end user controller or cell phone, or at a server operated by a monitoring system, in which case vendors, drivers (deliverers) and food recipients would interact by phone or via the Internet with the application program thereat.

In an embodiment that relies upon an application program comprising computer readable instructions operational in the cell phone of a person seeking to order food, so that the food is delivered in a secured food container, the application program operates as follows. First, the user will initiate the application program. In this case, the application program operates as a food delivery application program. The food delivery application program provides access and interaction with outside applications, such as search programs, electronic restaurant guides, and food vendors electronic ordering systems. The application program is enabled to allow the user to then order food for secured delivery, and pay for the food directly.

It is at that time that the driver receives a notification to pick up and deliver the food ordered by the user. As such, a driver travels to the vendor chosen. The vendor either has already secured the food for secure delivery in a container (i.e., a bag or box) available independent of the driver at the vender location, or provides and secures the food for delivery in a driver container, according to the above procedure. In any case, signals are generated and received by one or more of a vendor monitoring system, a GrubGuard™ monitoring system (server in the Cloud), the driver controller (cell phone and/or application program) or the intended recipient's controller (cell phone and/or application program. Similarly, authorized access (successful delivery) or unauthorized access is communicated.

Figure 9:
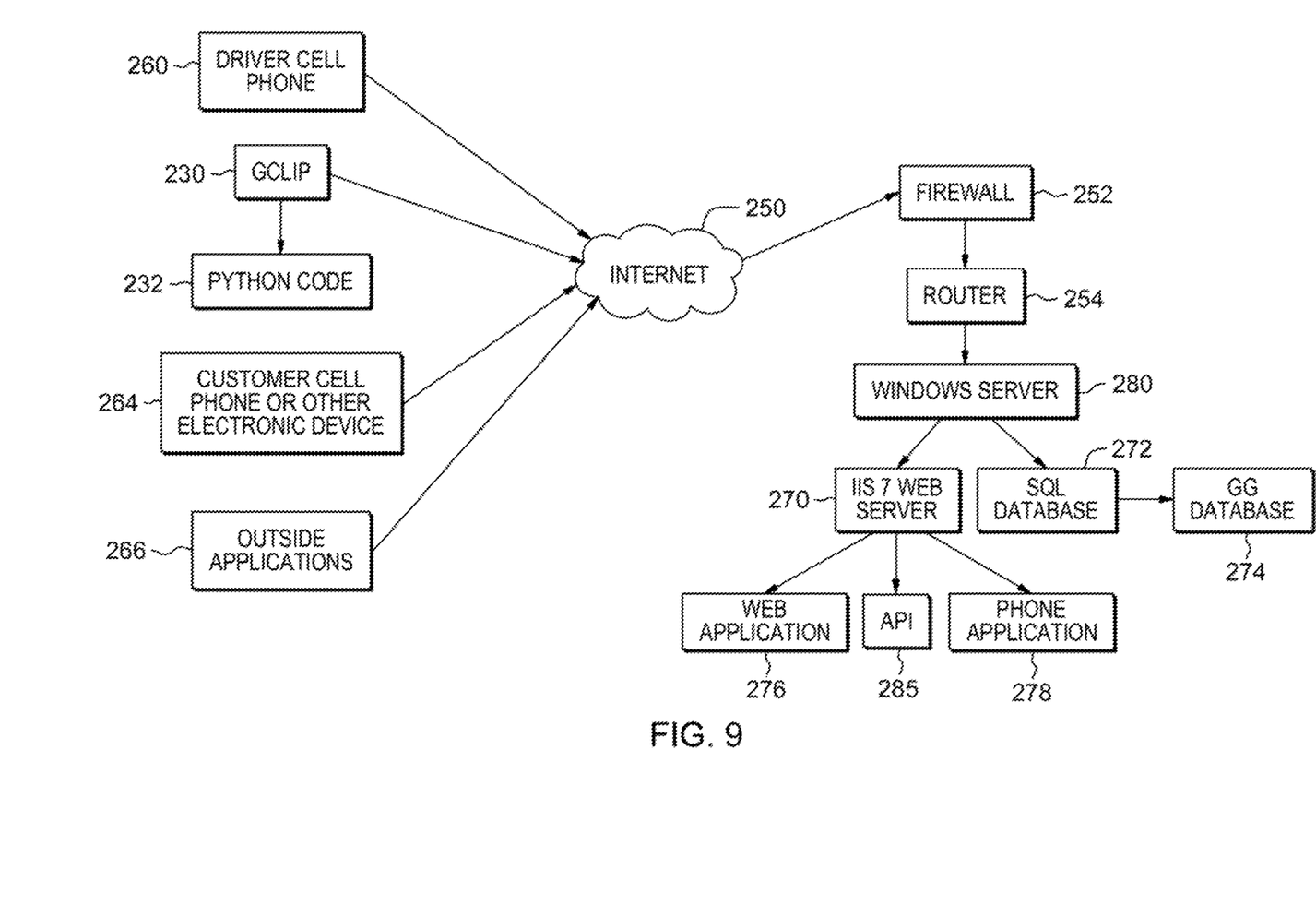
FIG. 9 presents a diagram highlighting operation of a prototype of the inventive device for securing or clip, and system and method that rely upon same.

Applicant herein constructed a prototype device for securing or clip ("inventive clip), and programmed and tested the inventive clip in operation, to verify the application program. FIG. 9 depicts the details of that implementation and operation. As shown therein, Gclip™ (device for securing) 230 communicates with the driver cellphone or other electronic device 260, the customer cellphone or other electronic device 264 and/or other outside applications 266, such as vendor or point of sale applications, via the Internet 250. The Internet also enables communication by any of the Gclip™ (device for securing) 230 communicates with the driver cellphone or other electronic device 260, the customer cellphone or other electronic device 264 and/or other outside applications 266 to the API 285 through the monitoring system (web server) 270, as shown, via windows server 280. The Windows server 289 is protected by router 254 and firewall 252. Please note that the monitoring system 270 operates with SQL database 272 and secondary database 274, where necessary. The monitoring system 270 also can access wen application 276 and phone applications 278, as now explained.

The inventive secure food delivery security system is a system that includes a device for securing as an electronic clip that once attached to a package (e.g. food delivery) can send data to a web based database where customers can view when and how often the clip was opened potentially causing a risk to the quality of their food delivery. The system comprises a web application, a phone application, a SQL database, a physical clip design to both secure food bags and house an embedded electronic component, and software designed to control the embedded device to send data to the web based system once opened. The system also includes an API or Application Programming Interface that allows outside systems (like the clip) or outside vendors (Grub Hub) to add data to the system such as customer orders. The invention also provides a container that is fully closed and secured using a device for securing functionality, as explained in greater detail below.

The physical device for securing (e.g., a dip) and/or secured container when opened makes an electrical connection (or breaks an electrical connection) that activates an embedded electronic device that sends data to a website identifying when the dip/secured container was opened ("opened" means transitioning from a secured or armed state, to a unsecured or unarmed state). The embedded electronic device (raspberry pi 3) that, once powered up, connects to the users/driver's phone based internet connection (hotspot) to gain access to the Internet. The embedded electronic device (raspberry pi 3) device then automatically starts custom designed Python software designed to add data to a web based database that can then be accessed by both the prototype website and also the prototype phone application. To verify operation, a website designed in ASP.net using C# as its programming language and hosted by Microsoft's IIS 7 web server that enables the data being sent by the dip to be displayed in a demo environment as to how the drivers, customers, and Grub Guard administrators will interact with the data that is sent and stored in the SQL database. The Microsoft SQL Server Database was designed to house the data for drivers, users, dip data, and customer and order data created and stored by the demonstration system.

The invention provides apparatus for securing food delivery items to prevent tampering of the food delivery items by food delivery persons. The apparatus may include a secure food container into which food items for delivery are arranged, a clip for securely closing food items into a conventional "to go" bag, the dip and container adapted to secure the food items, detect tampering and communicate any detected tampering of the activated container, or bag with an activated dip, to the consumer that called in the order and/or the retailer that has supplied the food items for delivery and/or a server in which a food delivery management application program is operational and/or an application programming interface (API).

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

The following is computer program listing appendix submitted in compliance with 37 CFR 1.52(e), including Python code that controls the device for securing/containers.

What is claimed is:
1. A tampering detection system comprising:
a clamping mechanism having an open position and a closed position;
a sensor configured to detect the clamping mechanism position and supplying sensor signals representative of the clamping mechanism positions;

a selectively engageable synchronization button having an interface connected to a controller interface to supply a synchronization signal;

a controller having an interface to accept the sensor signals, the controller selectively creating an armed condition in response to receiving a closed position sensor signal within a predetermined duration of time from receipt of the synchronization signal, and subsequent to the armed condition being initiated, supplying an alarm signal in response to receiving an open position sensor signal; and, wherein the clamping mechanism is selected from the group consisting of a latch comprising a latching end with a depressible button and locking bridge, or a clip comprising graspable opposing compressible members.

2. The system of claim 1 wherein the sensor has an interface configured to measure temperature and supply a temperature signal representative of the measured temperature; and, wherein the controller receives the temperature signal and supplies a temperature alarm signal in response to the measured temperature deviating from a predetermined set temperature.

3. The system of claim 1 further comprising:
a communications element having an interface to receive the alarm signal from the controller and an interface to transmit the alarm signal.

4. The system of claim 3 wherein the controller supplies an armed notification signal in response to creating the armed condition; and, wherein the communications element receives the armed notification signal from the controller and transmits the armed notification signal.

5. The system of claim 4 wherein the controller initiates a synchronization process in response to the receiving the synchronization signal; and, wherein the communications element establishes synchronized communications with an external device selected from the group consisting of a wireless device and a docking station, in response to the synchronization process.

6. The system of claim 5 wherein the controller supplies the alarm signal in response to losing synchronized communications with an external wireless device.

7. The system of claim 5 further comprising:
an external device software application comprising a sequence of processor executable steps embedded in a non-transitory memory medium for:
establishing synchronized communications with the communications element;
receiving the armed notification signal representing the clamping mechanism closed condition;
sending monitoring signals to a server indicting receipt of the armed notification signal;
subsequent to receiving the armed notification signal, receiving the alarm signal representing the clamping mechanism open condition; and,
sending monitoring signals to the server indicating receipt of the alarm signal.

8. The system of claim 7 further comprising:
a monitoring server comprising a non-transitory memory collecting information selected from the group consisting of tampering detection status, originator entity, recipient entity, and delivery entity.

9. The system of claim 4 further comprising:
a light emitting diode (LED) being illuminated in a first condition in response to the synchronization button being engaged, and subsequent to the LED being illuminated in the first condition, illuminating the LED in a second condition in response to the controller supplying the armed notification signal.

10. The system of claim 1 further comprises:
a closable container comprising a bag with a single-point opening orifice; and,
wherein a clamping mechanism is a clip sealing the bag orifice when in the closed position.

11. The system of claim 10 wherein the bag is disposable.

12. The system of claim 1 wherein the clamping mechanism is a latch; and,
the system further comprising:
a closable container comprising a first part of the latch, selected from the group of latch components consisting of the latching end and the locking bridge, and a cover comprising a second part of the latch consisting of an unselected latch component.

13. A tampering detection method comprising:
providing a clamping mechanism having an open position and a closed position;
detecting the clamping mechanism closed position;
detecting a synchronization signal,
creating an armed condition as follows:
initializing the armed condition in response to detecting the synchronization signal; and,
subsequent to detecting the clamping mechanism closed position sensor signal within a predetermined duration of time from the detection of the synchronization signal, creating the armed condition;
subsequent to the armed condition being initiated, detecting the clamping mechanism open position;
supplying an alarm signal in response to detecting the clamping mechanism open position; and,
wherein the clamping mechanism is selected from the group consisting of a latch comprising a latching end with a depressible button and locking bridge or a clip comprising graspable opposing compressible members.

14. The method of claim 13 further comprising:
transmitting the alarm signal.

15. The method of claim 14 further comprising:
creating an armed notification signal in response to creating the armed condition; and,
transmitting the armed notification signal.

16. The method of claim 13 further comprising
initializing a synchronization process in response to the synchronization signal; and,
establishing synchronized communications with an external device, selected from the group consisting of a wireless device and a docking station, in response to the synchronization process.

17. The method of claim 16 wherein supplying the alarm signal includes supplying the alarm signal in response to losing synchronized communications with an external wireless device.

18. The method of claim 16 further comprising:
providing a light emitting diode (LED);
illuminating the LED in a first condition in response to detecting the synchronization signal; and,
subsequent the LED being illuminated in the first condition, illuminating the LED in a second condition in response to the armed notification signal.

19. The method of claim 13 further comprises:
providing a container with a single-point opening orifice; and,
sealing the container orifice when the clamping mechanism is in the closed position.

20. The method of claim 19 further comprising:
measuring a temperature inside the container; and,
supplying a temperature alarm signal in response to the measured temperature deviating from a predetermined set temperature.

21. A tampering detection system comprising:
a latch clamping mechanism comprising a latching end with a depressible button and locking bridge, and having an open position and a closed position;
a sensor configured to detect the clamping mechanism position and supplying sensor signals representative of the clamping mechanism positions;
a controller having an interface to accept the sensor signals, the controller selectively creating an armed condition in response to receiving a closed position sensor signal, and subsequent to the armed condition being initiated, supplying an alarm signal in response to receiving an open position sensor signal; and,
a closable container comprising a first part of the latch, selected from the group of latch components consisting of the latching end and the locking bridge, and a cover comprising a second part of the latch consisting of an unselected latch component.

22. A tampering detection method comprising:
providing a clamping mechanism having an open position and a closed position;
detecting the clamping mechanism closed position;
creating an armed condition in response to detecting the clamping mechanism closed position;
subsequent to the armed condition being initiated, detecting the clamping mechanism open position;
supplying an alarm signal in response to detecting the clamping mechanism open position;
initializing a synchronization process in response to the synchronization signal; and,
establishing synchronized communications with an external device, selected from the group consisting of a wireless device and a docking station, in response to the synchronization process; and,
wherein the clamping mechanism is selected from the group consisting of a latch comprising a latching end with a depressible button and locking bridge or a clip comprising graspable opposing compressible members.

* * * * *